June 26, 1973    A. LOUIS    3,741,843
METHOD OF CONNECTING TWO MEMBERS WITH AN ELASTOMERIC HINGE
Filed March 1, 1971
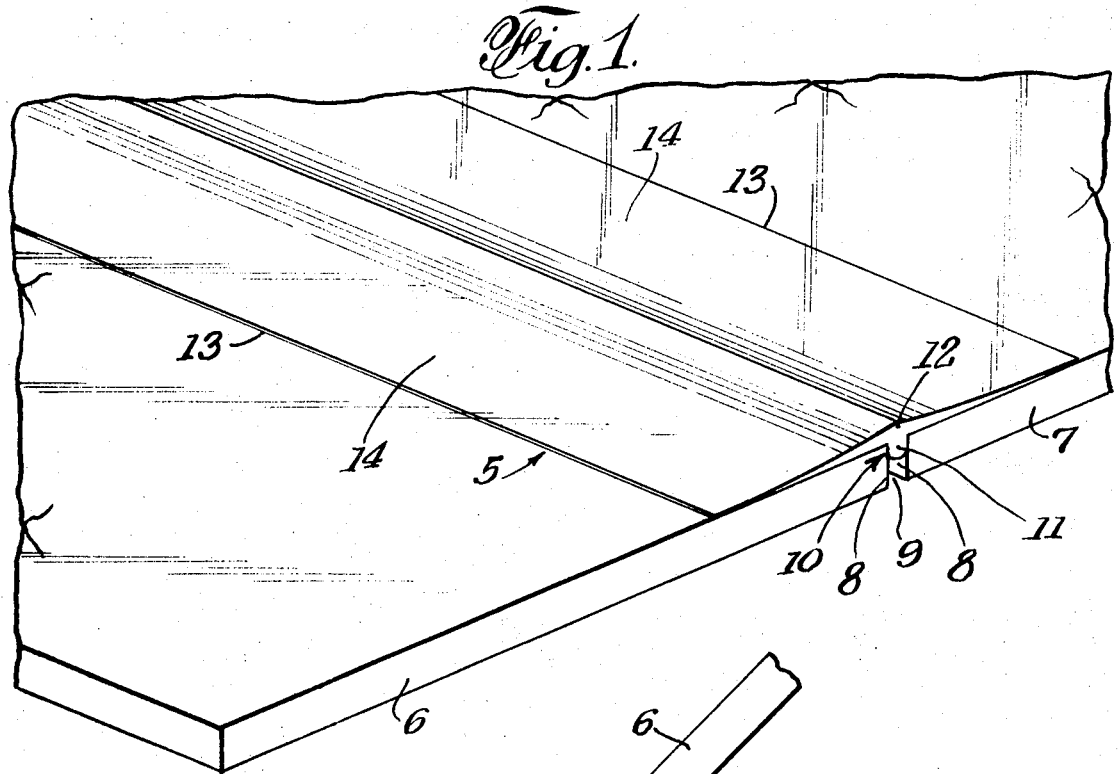
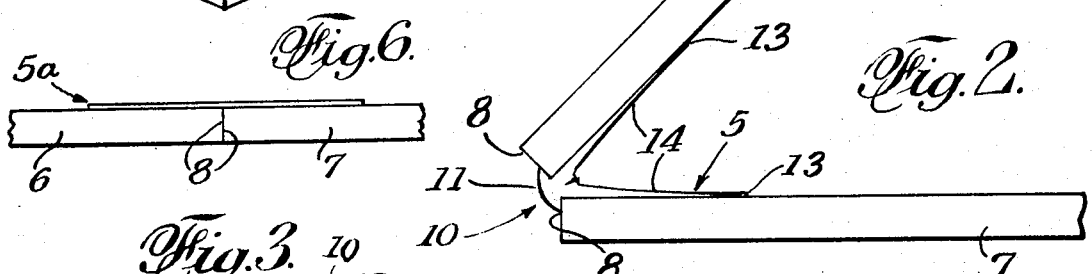
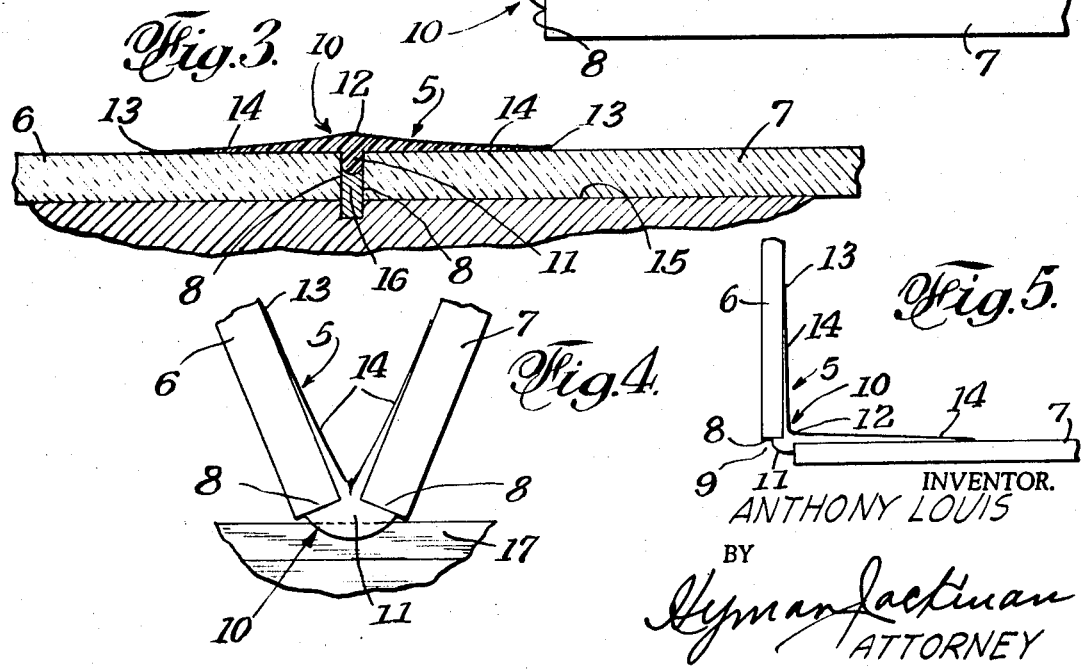
INVENTOR.
ANTHONY LOUIS
BY
Hyman Jackman
ATTORNEY United States Patent Office 3,741,843
Patented June 26, 1973

3,741,843
METHOD OF CONNECTING TWO MEMBERS WITH AN ELASTOMERIC HINGE
Anthony Louis, Los Angeles, Calif., assignor to Aquaria, Inc., Los Angeles, Calif.
Continuation-in-part of abandoned application Ser. No. 45,408, June 11, 1970. This application Mar. 1, 1971, Ser. No. 122,572
Int. Cl. B32b 3/02; B29c 27/00
U.S. Cl. 156—244                    4 Claims

ABSTRACT OF THE DISCLOSURE

A hinge of elastomeric material for connecting adjacent edge portions of two members to connect the same so one can be swung from a coplanar or angular position relative to the other to a different angular position relative to said other member. The hinge is formed of silicone rubber or other silicone or siloxane having many of the properties characteristic of rubber, the same being applied, while in an uncured, extrudable form, upon surfaces adjacent the mentioned edge portions, and when cured having the above-mentioned rubber-like properties.

CROSS-REFERENCES TO RELATED APPLICATIONS

This application is a continuation-in-part of pending application, Ser. No. 45,408, filed June 11, 1970 now abandoned and bearing title "Novel Aquarium."

BACKGROUND OF THE INVENTION

Field of the invention

The connection of two members by an elastomeric polymer with rubber-like characteristics to provide said members with a connecting hinge.

Description of the prior art

So-called "plastic" hinges are known, the same being disclosed in Pats. Nos. 3,019,486; 3,095,995 and 3,445,-052. Each of these patents reduces the thickness of a continuous, sheet-like member to form a "neck" on which the opposite ends of said member are adapted to be swung relatively to each other.

SUMMARY OF THE INVENTION

An elastomeric hinge in the form of a tape, having a thickened intermediate portion coextensive with the opposite edges thereof, and the thinner strip-like portions between said thickened portion and the tape edges being bonded to coplanar faces or angularly related faces of two members spaced apart and which are hingedly connected by said tape. An alternative form has the tape substantially of uniform thickness throughout. Also, the two members connected by the hinge may be in edge abutment. Said tape comprising a cured elastomeric polymer which, while in an uncured plastic form, is applied to the mentioned faces of the member, as by extrusion from a collapsible container. The two members, thus connected with the thickened portion of the tape extending partly between the members comprising a hinge of which the thickened portion is the hinge part on which said two members are relatively swingable.

An object of the present invention is to provide an elastomeric hinge of the character above referred to that is strong, long-lasting, and easy to apply.

Another object of the invention is to provide an elastomeric hinge that is water and weather proof, and resistant to most solvents.

A further object of the invention is to provide a simple and improved method of producing an elastomeric hinge while simultaneously connecting two members and adapting them for relative hinged movement.

The invention also has for its objects to provide a novel, economical and convenient method of superior utility for providing an elastomeric hinge of general superiority.

The invention also contemplates novel combinations of method step as well as of novel details of an elastomeric hinge having novel characteristics, which will appear more fully in the course of the following description which is based on the accompanying drawing. However, said drawing merely shows and the description merely describes the invention with respect to a preferred hinge construction and to preferred methods, the same being given by way of illustration or example only.

In the drawing, like reference characters designate similar parts in the several views.

BRIEF DESCRIPTION OF THE DRAWING

FIG. 1 is a broken perspective view of the present hinge and shown as connecting two coplanar members, FIG. 2 is a broken end view of the hinge and members shown in FIG. 1, one of said members being shown in a hinged position relative to the other, FIG. 3 is a fragmentary cross-sectional view showing the means of FIG. 1 as produced according to one method, FIG. 4 is a fragmentary end view showing a step in an alternate method of producing the present hinge, FIG. 5, to a smaller scale, shows an end view of a modification, FIG. 6 is a broken end view of a form of hinge of substantially uniform thickness throughout.

DESCRIPTION OF THE PREFERRED EMBODIMENT

With particular reference to FIG. 1, the present elastomeric hinge 5 is shown as connecting two coplanar members 6 and 7 which, in this instance, are shown as sheets of transparent material, as glass, and certain plastics, "Lucite," an acrylate resin comprising polymethylmethacrylate, and "Plexiglas," thermoplastic (polymethylmethacrylate)-type polymers in cast sheets, for instance. However, the members 6 and 7 need not be transparent since many materials, as wood, wood compositions, opaque plastics, metal, etc. may be used for these members. It will be noted, in this instance, that the adjacent edges 8 of members 6 and 7 are separated to form a space 9.

The hinge 5 is formed to have a thickened portion, generally designated 10, the same comprising a bead-like lower extension 11 disposed in said space 9 between the edges 8, and a portion 12 that, in this case, is gradually thickened from the opposite edges 13 of the tape-like hinge. The two portions 14 extending from the thickened portion 10 to each edge 13, comprise thinner sheets that are bonded to the upper surfaces of the members 6 and 7 adjacent to the edges 8.

For the most efficient operation of the hinge and to minimize or obviate spring-back of the members 6 or 7, when swung to an angular position relative to the other member, as in FIG. 2, for instance, the lower extension 11 should not be unduly thick. As shown in FIGS. 1 and 3, the extension 11 is relatively small, having a small amount of bonding adhesion with the edges 8 of the members 6 and 7. The mass of said extension being small, the same will readily stretch when members 6 and 7 are swung relatively, as shown in FIG. 2. Thus, when it is desired that one member retain its swung-open position relative to the other, the thickness or mass of extension 11 may be kept small. When it is desired that the portion 10 aid the return of the member that is swung open, the thickness of the extension may be greater, accordingly. In some instances, during application of the hinge to the members 6 and 7, an unduly large amount of the hinge material may fill the space 9 and may even extend substantially beyond the lower faces of said members. In such case, the hinge may not function as desired and excess material may be removed.

FIG. 5 shows the hinge 5 as applied to and connecting members 6 and 7 which are moved to angularly related positions rather than being coplanar, as in FIG. 1. It will be evident that one member, 6 or 7, may be swung relative to the other member, in either direction. The extension 11 of the thickened portion 10 is disposed between the edges 8 in the space 9, as before. In this arrangement of the panels both parts 11 and 12 may be stretched or compressed, depending on the direction of hinged movement of one of the members 6 or 7.

The size of extension 11 may be controlled by placing the members 6 and 7 on a base having a surface 15 provided with a rib 16 disposed in the space 9 and extending toward and short of the upper surfaces of the members 6 and 7. One means for controlling the thickness of the hinge portion 10 is shown in FIG. 3. The base may have a flat surface, as in FIG. 3 or a surface that includes the angle between the members 6 and 7, as in FIG. 5. In any case, if the extension is too thick, it may be routed out to the thickness desired while the members 6 and 7 are retained in their initial relation or by forcing one such member angularly relative to the other and using a sharp instrument, such as a razor blade 17, to cut away any excess of extension 11 that may prevent operation of the hinge, as desired.

As hereinabove indicated, the present hinge may connect members 6 and 7 of various materials and in various fields of use. The same is especially useful in home aquarium construction wherein one member 7 may be a stationary transparent top plate (glass, or plastic) and the other member 6, a lid to afford access to the interior of the aquarium for whatever purpose.

Silicone rubber is preferred as the material of which the present hinge is formed, especially because the same is available in an uncured, extrudable form, will cure in a normal room atmosphere (approximately 75° F.) over a period of about 24 hours to an elastomeric consistency, and will firmly bond and strongly adhere to glass or plastic as well as a wide range of material, including wood, wood composition, metals, etc. It will be understood that the above given time and temperature may not be required when curing silicone rubber, or, when one or more of the elastomeric materials hereinbelow mentioned are used instead of silicone rubber, since an increased application of the heat will shorten the curing time, according to the increase in degree of heat.

EXAMPLE I

Two panel members 6 and 7 were placed in edge-to-edge abutment. The nozzle of a collapsible tube of silicone rubber in uncured mastic form was moved along the line of abutment and the tube squeezed to eject the contents upon adjacent surfaces of said member and across the line of abutment. While still in an uncured state, the application of the material was spread thinly upon said surfaces, as shown in FIG. 6. While the thickness of the application may be varied, as desired, in this example, the same was in the nature of 1/32".

In the uncured state of the silicone rubber, the same has adhesive properties that cause the application to adhere to the surfaces of the panel members. When said members were glass or plastic, i.e., non-porous or substantially so, the tape or ribbon of silicone rubber became bonded to the panel members without any application of heat or undue pressure, within a time period of approximately twenty-four hours. Thus cured, the resultant hinge was readily pliable and showed no tendency to stretch or crack. The bond between the hinge of 1/32" thickness and the panels not only withstood a 150 lb. force seeking to pull the hinge from the panels, the hinge itself withstood being torn apart by such force.

Additional tests were conducted, substituting a polymethane elastomeric sealant (a product of E. I. du Pont sold under the trade name "Imron") falling in the class of materials of polyurethane resins that are non-foamed, solid and flexible, materials broadly called polyurethane rubber or polyester rubber. The conditions of Example I were followed with this material and the results obtained were substantially similar to the results obtained with silicone rubber.

Like results under the same conditions of testing were obtained with polysulfide rubber (a product of Thiokol Chemical Corp. sold under the trade name "Uni Parmastic 600"; also, a product of Parr Instrument, Inc. sold under the trade name "Uni Parseal").

Under the above conditions, neoprene (latex) proved satisfactory with respect to the manner of forming the hinge and of the end products; i.e. forming a hinge while simultaneously permanently securing the same to the members it connects.

The above-mentioned elastomeric materials have the characteristic of being plastic (paste-like) at room temperature, thereby being adapted for easy application, as above described. Said materials have the further characteristic of firmly bonding to the surface of a member that is non-porous or substantially so, no additional step or steps being required. And, finally, said materials when cured, as above suggested, cure to a rubber-like consistency to provide the pliability, low stretchability, and crack-resistance desired.

The method described in Example I was carried out for the form of hinge shown in FIGS. 1 and 3 with the following changes; the members 6 and 7 were spaced apart and, when the uncured material was applied to said members, the thickened portion 10 and the thinner portions 14 were formed before curing became effective.

While I have illustrated and described what I now contemplate to be the best modes of carrying out my invention with respect to both the method and article, the same is, of course, subject to modification without departing from the spirit and scope of my invention.

Having thus described the invention, what is claimed and desired to be secured by Letters Patent is:

1. The method of forming an elastomeric hinge to connect adjacent portions of two substantially non-porous members, said method consisting of the steps of:
   placing said two members with an edge of one adjacent to an edge of the other,
   applying by extrusion an elastomeric material while the same is in plastic form directly upon and along surface portions of said members that are adjacent to the mentioned edges thereof and at least partly between said edges so that the tape of mastic material thus formed extends from the mentioned surface portion of one said member across said adjacent edges to the mentioned surface portion of the other said member, and
   curing said mastic tape over a time within a period up to twenty-four hours to effect curing of the tape to a rubber-like and crack- and stretch-resisting consistency to cause bonding of the tape to the mentioned adjacent surface portions of the non-porous members and the edges thereof.

2. The method according to claim 1 in which the two mentioned members are disposed to form a space between adjacent edges of the member.

3. The method according to claim 1 in which the medial portion of the tape extending across said space is thickened in relation to the lateral portions of the tape during application of the tape and are bonded to the two members connected by the tape.

4. The method according to claim 2 in which the thickened portion of the tape during formation of the tape is formed to be partly above the bonded portions of the tape and partly between the spaced edges of the non-porous members and bonded to the mentioned edges of said members.

References Cited

UNITED STATES PATENTS

| 2,392,734 | 1/1946 | Haberstump | 156—304 X |
| 3,261,735 | 7/1966 | Brown | 156—304 X |
| 3,251,912 | 5/1966 | Fish | 156—304 X |
| 2,598,629 | 5/1952 | Whyte | 156—304 X |
| 3,553,043 | 1/1971 | Anderson | 156—304 X |
| 2,756,892 | 7/1956 | Bleuze et al. | 156—304 X |
| 3,651,975 | 3/1972 | Callan | 220—6 X |

PHILIP DIER, Primary Examiner

U.S. Cl. X.R.

156—304; 161—37; 220—4, 6, 30; 229—16, 44